United States Patent
Barriga et al.

(10) Patent No.: US 8,184,623 B2
(45) Date of Patent: May 22, 2012

(54) METHOD AND ARRANGEMENT FOR HANDLING PROFILES IN A MULTIMEDIA SERVICE NETWORK

(75) Inventors: Luis Barriga, Johanneshov (SE); David Castellanos Zamora, Madrid (ES); Nuria Esteban Vares, Aranjuez (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 317 days.

(21) Appl. No.: 12/596,470

(22) PCT Filed: Apr. 19, 2007

(86) PCT No.: PCT/SE2007/000372
§ 371 (c)(1),
(2), (4) Date: Feb. 25, 2010

(87) PCT Pub. No.: WO2008/130282
PCT Pub. Date: Oct. 30, 2008

(65) Prior Publication Data
US 2010/0177769 A1      Jul. 15, 2010

(51) Int. Cl.
*H04L 12/66* (2006.01)

(52) U.S. Cl. ............................................. 370/352
(58) Field of Classification Search .................. None
See application file for complete search history.

(56) References Cited

U.S. PATENT DOCUMENTS

| 8,112,523 B2 * | 2/2012 | Van Elburg et al. .......... 709/225 |
| 2004/0122934 A1 * | 6/2004 | Westman et al. .............. 709/223 |
| 2007/0076691 A1 * | 4/2007 | Varney et al. ................. 370/352 |
| 2011/0093927 A1 * | 4/2011 | Leppanen et al. ................ 726/4 |

* cited by examiner

*Primary Examiner* — Chirag Shah
*Assistant Examiner* — Amar Persaud (57) ABSTRACT

A method and apparatus for sharing an application profile for plural public IMS identities across different IMS subscriptions. A home application profile for a first public IMS identity (IMPUx) of a first IMS subscription, is stored in its entirety at a first HSS storage. A profile reference is stored as an abbreviated foreign application profile for a second public IMS identity (IMPUy) of a second IMS subscription at a second HSS storage. The profile reference points to the home application profile in the first HSS storage. An authorizing identifier for the second public IMS identity that authorizes access to the home application profile, is also stored at the first HSS storage.

14 Claims, 6 Drawing Sheets

METHOD AND ARRANGEMENT FOR HANDLING PROFILES IN A MULTIMEDIA SERVICE NETWORK

TECHNICAL FIELD

The present invention relates generally to a method and arrangement for maintaining application profiles for different user identities in a multimedia service network.

BACKGROUND

Various communication devices capable of packet-based multimedia communication using IP (Internet Protocol) are available today, such as fixed or mobile terminals including computers and telephones. Multimedia services involve packet-switched communication of data representing different types of media, such as audio, video, images, text, documents, animations, etc.

In 3G mobile telephony, wireless communication of multimedia is supported by communication technologies using IP (Internet Protocol). For example, the communication protocols used for GPRS (General Packet Radio Service) and WCDMA (Wideband Code Division Multiple Access) support both packet-switched multimedia services and traditional circuit-switched voice calls.

A network architecture called "IP Multimedia Subsystem" (IMS) has also been developed by the 3$^{rd}$ Generation Partnership Project (3GPP) as a platform for handling multimedia services and sessions based on IP transport. Thus, an IMS network can be used to initiate and control multimedia sessions for IP enabled terminals being connected to any type of access networks. The sessions are controlled by various session managing nodes in the IMS network, including the well-known IMS nodes S-CSCF (Serving Call Session Control Function), I-CSCF (Interrogating Call Session Control Function) and P-CSCF (Proxy Call Session Control Function). Further, a main database element HSS (Home Subscriber Server) stores subscriber data and authentication data for subscribing clients. The multimedia services are enabled and executed by various application servers that may reside within or outside the IMS network.

The signalling protocol called "SIP" (Session Initiation Protocol) is typically used for controlling multimedia sessions in IMS networks and other service networks. SIP-enabled terminals and servers can thus use this protocol to initiate and terminate multimedia sessions, e.g. by means of an IMS network.

According to 3GPP, it is required that a communication terminal accessing an IMS network is equipped with an IMS SIM (Subscriber Identity Module), or "ISIM", application in order to provide necessary authentication and subscriber data to the IMS network. Among other things, the ISIM application securely holds a home domain name for the subscriber, e.g. "imsop.com" where "imsop" represents the IMS operator. In general, only IMS enabled terminals are allowed to access the IMS network.

An ISIM application can be installed on a Universal Integrated Circuit Card (UICC), which is a card for holding service applications in multimedia terminals, as similar to the well-known SIM card in GSM terminals. A UICC can thus be used in any IP enabled terminals, such as fixed or wireless telephones, personal computers and Set Top Boxes (STBs) for television sets, to enable multimedia communication. The UICC can hold a plurality of different applications, including the ISIM application and also a USIM (UMTS Subscriber Identity Module) which is another application used for accessing UMTS networks. Various service applications for specific multimedia services, such as an IPTV application, can also be installed on the UICC.

Terminals having an ISIM application are referred to as "IMS enabled" terminals. Among other things, an ISIM holds an IMS Private Identity referred to as "IMPI" and at least one IMS Public Identity referred to as "IMPU", which are all known to the IMS network. The private identity IMPI is used for authentication during registration, re-registration and de-registration, and is therefore also stored in the HSS node, not to be disclosed to any third parties.

The public identity IMPU can be used by any services/users to identify subscribers and/or their equipment when participating in IMS sessions, as analogous to an e-mail address or a telephone number. The IMPI identifies a subscription (and not a specific user), whereas each IMPU identifies a user, or a user group, having an IMS profile, which will be described in more detail below. A user may thus have plural IMPUs provisioned on the ISIM, one of which is a default IMPU, whereas only one IMPI can be provisioned on each ISIM. Generally, an IMS subscription can have more than one ISIM/IMPI for different terminals, and a user may have any number of IMPUs provisioned on one or more ISIMs and stored in the HSS node.

Figure 1:
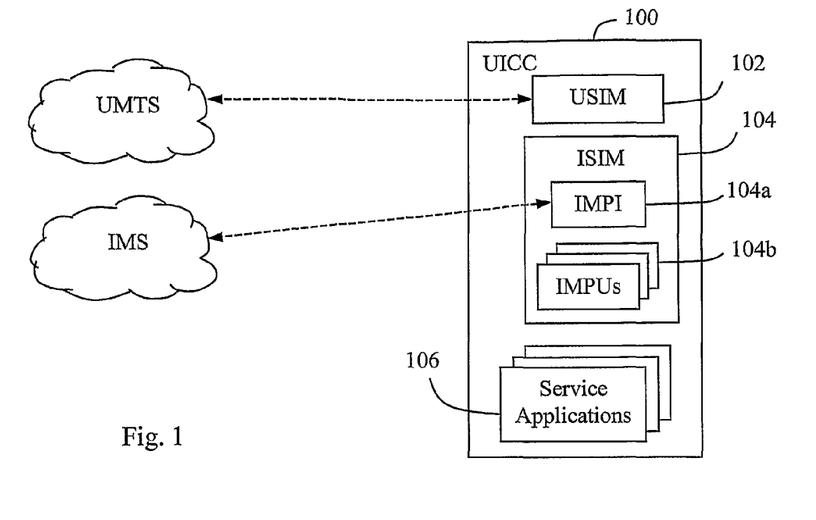
FIG. 1 is a block diagram of a Universal Integrated Circuit Card, UICC, according to the prior art.

FIG. 1 illustrates schematically an exemplary UICC 100 holding a USIM application 102, an ISIM application 104, as well as a plurality of further applications 106 for various specific multimedia services. The USIM application 102 is used for accessing a UMTS network, and the ISIM application 104 is used for accessing an IMS network, as shown by means of dashed two-way arrows. The ISIM application 104 holds a single IMPI 104$a$ that is used for authentication towards the IMS network, and a plurality of IMPUs 104$b$ which can be associated with different IMS profiles for different users. An IMS profile may contain one or more application profiles, each specifying various preferences and restrictions regarding a particular service application when activated with that IMPU.

Thus, when a particular user activates the IMS service on a terminal having the UICC 100 in order to start a multimedia session according to an invoked application, the IMPI 104$a$ is first used for authentication with the IMS network. His/her associated or selected IMPU 104$b$ is then activated in the IMS network (typically in the S-CSCF node) to determine the profile to be used for the invoked application. Depending on the implementation, a specific IMPU may be automatically activated when the associated user logs on to the IMS service, and a user may additionally also be free to select an IMPU from a set of optional IMPUs. Even if the UICC would only host the USIM and no ISIM, it may in some implementations still be possible to access an IMS network by deriving the IMPI and an IMPU from the USIM identity.

Figure 2:
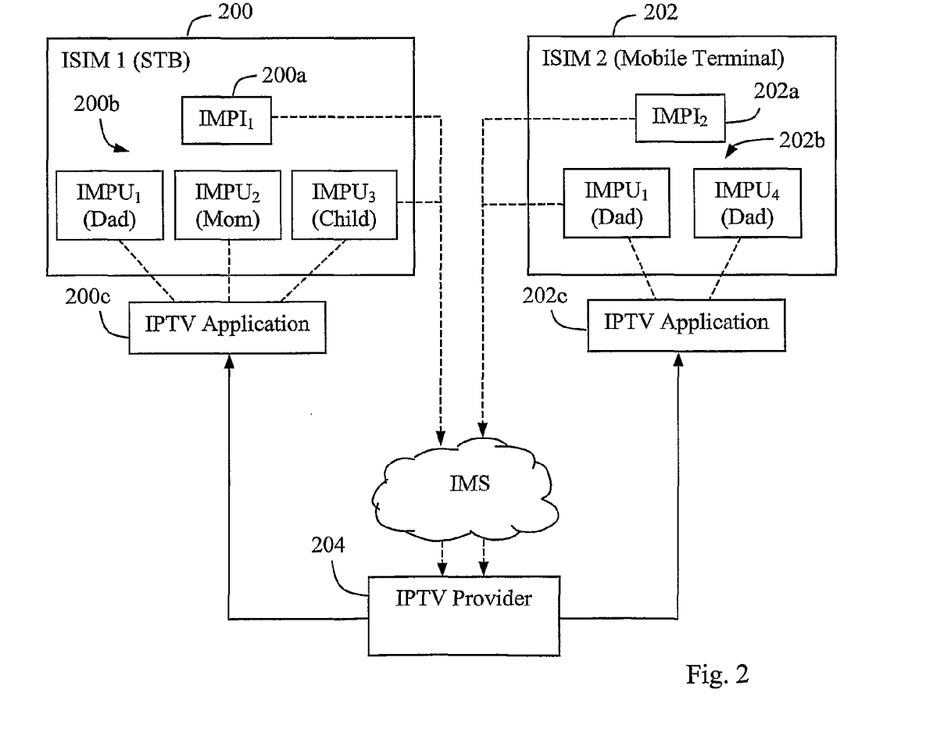
FIG. 2 is a block diagram where IMS Subscriber Identity Modules, ISIMs, reside in two different communication terminals for obtaining an IPTV service, according to the prior art.

FIG. 2 illustrates an example of IMS subscription usage by a family comprised of "Dad", "Mom" and "Child", the subscription involving two separate cards with ISIM applications. In this example, a first ISIM application 200 is installed in an STB (Set Top Box) used by all family members. An extra card with a second ISIM application 202 under the same subscription is also installed in a mobile terminal only used by Dad. Both the STB and the mobile terminal are capable of receiving an IPTV service from an IPTV provider 204.

The first ISIM 200 in the STB holds a single IMPI$_1$ 200$a$ and a plurality of IMPUs 200$b$ where a first IMPU$_1$ is associated with Dad, a second IMPU$_2$ is associated with Mom, and a third IMPU$_3$ is associated with the child. For example, the first IMPU$_1$ may indicate that Dad prefers a specific format for news programs, and the third IMPU$_3$ may indicate that the child is not allowed to watch certain types of programs or after a certain time of day. Each family member can thus enjoy personalized IPTV services based on their individual IMPUs and associated profiles. A common IMPU and associated profile valid for the family may also be used in addition to the personal ones, although not shown here.

The second ISIM 202 in the mobile terminal holds a single $IMPI_2$ 202a and two different IMPUs 202b both being associated with Dad, where one $IMPU_1$ provisioned in ISIM 202 is in fact also provisioned in the first ISIM 200, but the other $IMPU_4$ is only provisioned in ISIM 202.

The dashed arrows in the figure illustrate that content from the IPTV provider 204 is requested over an IMS network, using either the STB or the mobile terminal. First, the IMPI in either ISIM 200, 202 is used for authentication, and a selected IMPU is then used for obtaining content from the IPTV provider according to the associated profile. In this case, one of the IMPUs 200b in ISIM 200 may be activated automatically when using the STB as the associated user logs on to the IMS service, whereas Dad may be free to select one of the two IMPUs 202b in ISIM 202 when using the mobile terminal. In either ISIM 200, 202, a default IMPU may thus be automatically activated unless the user selects another IMPU.

According to the IMS concept, an IMS profile may include different types of sub-profiles:

1) The User Profile contains service independent personal information related to the subscription, such as a name, birthday date, nationality, home address and billing address.

2) The Service Profile contains a collection of service and user information. Each IMPU is associated with a single service profile, although more than one IMPU can be associated with the same service profile.

3) The Application Profile contains preferences and restrictions regarding a specific service application, and is thus used to adapt the service for a certain user. An IMPU can include plural application profiles defined for the user associated with that IMPU.

A set of such sub-profiles are provisioned and maintained in the HSS node for each IMPU. It is assumed that the IMS operator has the infrastructure and routines needed for provisioning the IMPUs and related profiles into the HSS node and also into the concerned IMS terminals. However, it is not necessary to describe the provisioning of IMPUs in greater detail in order to understand the present invention.

As mentioned above, an IMS subscription can incorporate more than one IMPI intended for different IMS terminals or devices, each IMPI having any number of IMPUs associated with different sub-profiles. A particular IMPU can also be valid for more than one IMPI. An example of this subscription model is schematically outlined in FIG. 3.

Figure 3:
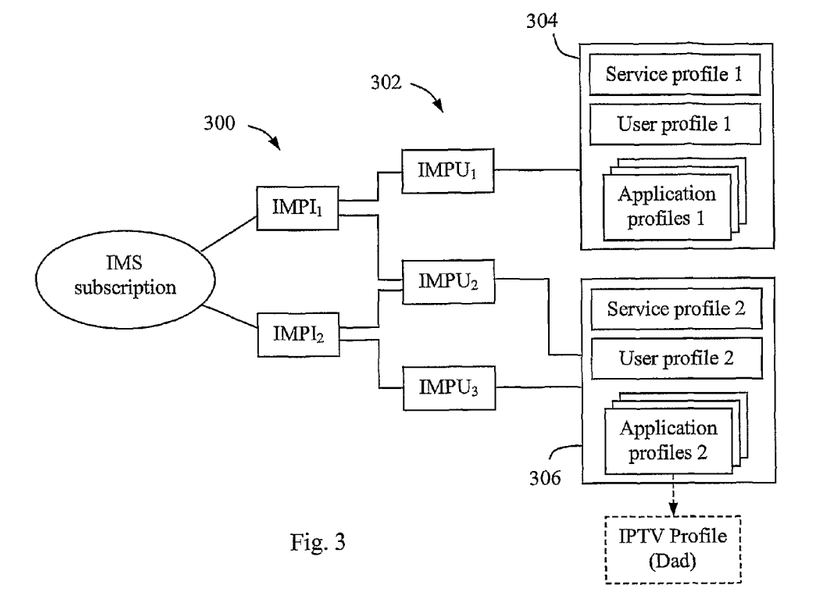
FIG. 3 is a logic block diagram schematically illustrating an example of a subscription model that may be adopted for IMS systems.

The shown IMS subscription comprises two private IMS identities 300:. $IMPI_1$ and $IMPI_2$ stored respectively on separate UICC cards inserted in two different IMS terminals such as an STB and a mobile terminal. $IMPI_1$ is associated with two public IMS identities 302: $IMPU_1$ and $IMPU_2$, and $IMPI_2$ is associated with two public IMS identities 302 as well: $IMPU_2$ and $IMPU_3$.

Two sets of sub-profiles 304, 306 are also shown in FIG. 3 having different service profiles, user profiles and application profiles. In this example, $IMPU_1$ is associated with sub-profile set 304, whereas both $IMPU_2$ and $IMPU_3$ are associated with the same sub-profile set 306. As shown, a plurality of application profiles are included in each sub-profile set 304, 306, and the same application profile may be valid for multiple IMPUs and ultimately also for multiple IMPIs, as implied by the illustrated example of FIG. 3. Alternatively, $IMPI_1$ and $IMPI_2$ may be provisioned for separate IMS subscriptions, either under the same IMS operator or even under different IMS operators. However, the same application profile can presently be shared for different IMPIs only when the different IMPIs belong to the same IMS subscription. Generally, it is sometimes desirable to use the same application profile in different IMS subscriptions.

It should be noted in FIG. 3 that $IMPU_2$ defined for a specific user is valid for both $IMPI_1$ and $IMPI_2$. For example, an application profile defined by $IMPU_2$ can be then used by that user for a service in both IMS terminals, such as Dad being able to use his personalised IPTV application profile in both the STB and the mobile terminal for receiving IPTV in the example of FIG. 2, as indicated by the dashed box in FIG. 3.

Figure 4:
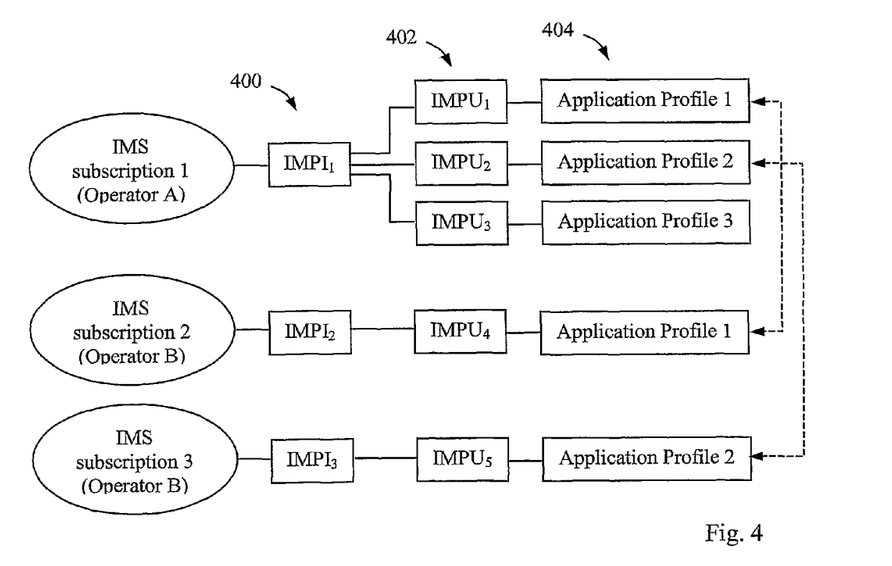
FIG. 4 is a logic block diagram schematically illustrating an example of implementing application profiles according to the current IMS subscription model.

When the same application profile is used for plural different IMS subscriptions, it is necessary to duplicate the application profile for each subscription, which is schematically illustrated in FIG. 4, and maintain it in corresponding HSS nodes. In this example, each IMS subscription incorporates a single private IMS identity 400. $IMPI_1$ of a first IMS subscription is associated with three public IMS identities 402: $IMPU_1$, $IMPU_2$, $IMPU_3$. $IMPI_2$ of a second IMS subscription is associated with the public IMS identity $IMPU_4$, and $IMPI_3$ of a third IMS subscription is associated with the public IMS identity $IMPU_5$. It is also assumed that subscription 1 is controlled by an IMS operator A and subscriptions 2 and 3 are controlled by another IMS operator B.

FIG. 4 also shows an application profile 404 defined for each IMPU, although further application profiles may of course be additionally defined for each IMPU as described above. More specifically, the dashed two-way arrows indicate that the same application profile 1 is defined for both $IMPU_1$ and $IMPU_4$, and the same application profile 2 is defined for both $IMPU_2$ and $IMPU_5$, respectively. IMS subscription 1 is shared by a group of three users (e.g. a family) and IMS subscriptions 2 and 3 are owned by single users (e.g. individual family members) also belonging to said user group. For example, the application profile 1 in FIG. 4 could be the same IPTV application used by Dad in both the STB with the first ISIM application 200 and the mobile terminal with the second ISIM application 202, as of FIG. 2.

Hence, if an application profile is desired for two different IMS subscriptions, the user is required to establish and maintain the same application profile for two IMPIs/IMPUs in both IMS subscriptions, which also must be provisioned in each corresponding HSS node, even if the parameters and conditions in the application profile are identical at both locations. If the user wants to update the application profile by changing, adding or deleting parameters and functions, this work must be done for each IMPU and IMS subscription.

Even if the different IMS subscriptions are controlled by the same IMS operator, it is still not practical to use the same IMPU and provision an application profile in the operator's HSS node to be shared by the two IMS subscriptions, since the service charging for that application cannot easily be distinguished between the two subscriptions. Of course, the charging problem above is even more immediate when the different IMS subscriptions are controlled by different IMS operators.

SUMMARY

It is thus desirable to reduce the effort and load of having one or more application profiles defined for plural IMS subscriptions. It is also desirable to reduce the storing, processing and traffic load required for establishing, provisioning and/or maintaining the same application profile in plural IMS subscriptions. Further, it is desirable that 3rd party application providers can gain a consistent view on an application profile for an entity.

It is an object of the present invention to address at least some of the problems outlined above. More specifically, it is an object to reduce the efforts as well as the storing, processing and traffic load for establishing, provisioning and/or maintaining the same application profile for plural IMS subscriptions.

These objects and others can be obtained by providing a method and an arrangement as specified in the attached independent claims.

According to one aspect, the present invention provides a method of sharing an application profile for plural public IMS identities across different IMS subscriptions. In the inventive method, a home application profile for a first public IMS identity of a first IMS subscription is stored at a first HSS storage. A profile reference is also stored at a second HSS storage as an abbreviated foreign application profile for a second public IMS identity of a second IMS subscription. The profile reference points to the home application profile in the first HSS storage. An authorising identifier for the second public IMS identity that authorises access to the home application profile is further stored at the first HSS storage. When the first HSS storage receives a request for the home application profile from an application server on behalf of the second public IMS identity by means of the profile reference, access to the home application profile is allowed for the application server according to the authorising identifier.

The first public IMS identity or an associated alias may be used as the profile reference, and the second public IMS identity or an associated alias may be used as the authorising identifier. The authorising identifier, can be added to an access list for the home application profile at the first HSS storage. The access list may contain a list of further authorising identifiers associated with other public IMS identities for which access is allowed to the home application profile.

To enable the application server to find the first HSS storage, the domain of the first HSS storage may be indicated in the profile reference. The second HSS storage can supply the profile reference in response to a request for the application profile from the application server on behalf of the second public IMS identity. The first HSS storage then provides the home application profile to the application server in accordance with the authorising identifier, in response to a request for the home application profile from the application server using the profile reference.

According to another aspect, the present invention also provides a home HSS storage. The inventive home HSS storage comprises a storing unit adapted to store a home application profile for a first public IMS identity of a first IMS subscription and an authorising identifier for a second public IMS identity of a second IMS subscription, to authorise access to the home application profile. The home HSS storage also comprises a providing unit adapted to provide the home application profile to an application server according to the authorising identifier, in response to a request for the home application profile from the application server on behalf of the second public IMS identity. It is assumed that a profile reference has been stored at a foreign HSS storage as an abbreviated foreign application profile for the second public IMS identity, and that the profile reference points to the home application profile in the home HSS storage.

According to yet another aspect, the present invention further provides a foreign HSS storage. It is assumed that a home application profile for a first public IMS identity of a first IMS subscription and an authorising identifier for a second public IMS identity of a second IMS subscription that authorises access to the home application profile, are stored at a home HSS storage.

The inventive foreign HSS storage comprises a storing unit adapted to store a profile reference as an abbreviated foreign application profile for the second public IMS identity. The profile reference points to the home application profile in the home HSS storage. The foreign HSS storage also comprises a supplying unit adapted to supply the profile reference in response to a request for the application profile from an application server on behalf of the second public IMS identity.

Further possible features and benefits of the present invention will be explained in the detailed description below by means of exemplary embodiments. Even though the present invention and its embodiments are generally described and defined here in terms of IMS for simplicity, it should be understood that any other equivalent or corresponding standards, protocols and network elements could be applied within the scope of the present invention.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention makes it possible to share the same application profile for plural IMS subscriptions, such that the application profile can be defined and maintained in its entirety for only one of the IMS subscriptions and be made available to the other IMS subscription(s) by means of a profile reference.

The application profile is thus first established and maintained for a public IMS identity IMPU of a first IMS subscription as a "home application profile", hosted in a home HSS node or similar storage. If the same application profile is to be made valid for another public identity IMPU of a second IMS subscription in a foreign HSS node or similar storage, a relatively brief profile reference related to the home application profile is stored as an abbreviated "foreign application profile" for the IMPU of the second IMS subscription. For example, the IMPU associated with the home application profile may be used as a suitable profile reference in the foreign application profile, although the present invention is not limited thereto.

An authorising identifier related to the foreign IMPU of the second IMS subscription, is also stored in an "Access List", referred to as the AL in the following, which is maintained together with the home application profile in the home HSS node. The AL for a home application profile thus effectively identifies one or more foreign IMPUs of other IMS subscriptions for which access to the home application profile can be allowed. For example, the foreign IMPU may be used as the authorising identifier in the AL, although the present invention is not limited thereto.

In this description, the term "home" is generally used to indicate the full application profile and its location, while the term "foreign" simply implies "non-home" i.e. the abbreviated application profile represented by the profile reference and its location. However, the home HSS node in this description does not necessarily have to belong to a "home IMS operator" in the traditional sense, even though this would most likely be the case in practice. Other indicative terms may be alternatively used to denote the above-defined home and foreign application profiles. For example, the home application profile could alternatively be termed the "primary", "main" or "chief" application profile, or similar. Furthermore, the foreign application profile could alternatively be termed the "secondary", "supplementary" or "auxiliary" application profile, or similar. Also, the terms "HSS node" and "HSS storage" represent any storage means suitable for storing application profiles, and any storage node equivalent to the HSS may be used in this context.

Figure 5:
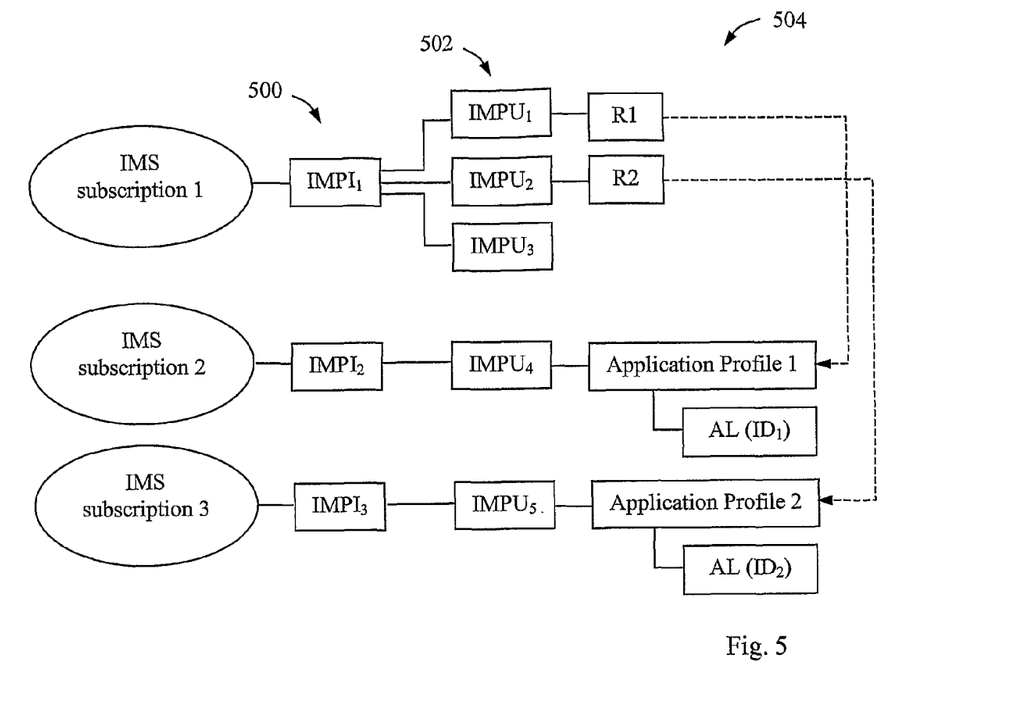
FIG. 5 is a logic diagram schematically illustrating an example of implementing the same application profiles for different IMS subscriptions, according to one embodiment.

FIG. 5 illustrates schematically an example of how home application profiles and foreign application profiles may relate to each other in different IMS subscriptions, in an embodiment useful as an inventive alternative to the situation shown in FIG. 4. Again, a private IMS identity (IMPI) 500 is valid for each of three shown IMS subscriptions, each IMPI 500 being associated with one or more public IMS identities (IMPUs) 502 in the same manner as described for FIG. 4. Subscriptions 1, 2 and 3 may be controlled by different IMS operators or by the same IMS operator.

An application profile 504 is also generally established and maintained for each public IMS identity 502. However, instead of duplicating the same information of application profile 1 for both $IMPU_1$ of IMS subscription 1 and $IMPU_4$ of IMS subscription 2 as in the situation of FIG. 4, the application profile 1 is established and maintained in its entirety for $IMPU_4$ only as a home application profile together with an AL containing an authorising identifier $ID_1$ valid for $IMPU_1$. The home application profile 1 and associated AL are hosted in a home HSS node or similar storage for IMS subscription 2. Of course, the AL in home application profile 1 may contain further such authorising identifiers associated with other foreign application profiles and IMPUs, not shown.

An abbreviated foreign application profile is also stored for the foreign $IMPU_1$ of IMS subscription 1 represented by a profile reference R1 that points to the home application profile 1 in the home HSS node. R1 is hosted in another HSS node or similar storage for IMS subscription 1, which in this context can be regarded as a foreign HSS node relative the home HSS node storing the home application profile 1. Whenever an application server or the like must access and retrieve application profile 1 to execute a service for $IMPU_1$, application profile 1 can be accessed from the storage of $IMPU_4$ by means of the profile reference R1, as indicated by a first dashed arrow.

Likewise, application profile 2 is established and maintained as a full home application profile for $IMPU_5$ together with an associated AL containing an authorising identifier $ID_2$ valid for $IMPU_2$, as hosted in another home HSS node or similar storage. A profile reference R2 is also stored for the foreign $IMPU_2$ of IMS subscription 1 as an abbreviated foreign application profile. When needed for executing a service for $IMPU_2$, the application profile 2 can be accessed from the storage of $IMPU_5$ by means of the profile reference R2, as indicated by a second dashed arrow.

In this inventive arrangement, it is only necessary to maintain and update the home application profile in its home HSS or similar storage, while the brief profile reference remains valid for providing access to the current home application profile on behalf of the foreign IMPU of another IMS subscription. Generally, an application profile can be created and updated either from a helpdesk or similar, or from the communication device or terminal, the latter being sometimes referred to as "self-provisioning".

The use of the profile reference and authorising identifiers in the AL allows for sharing a home application profile of one IMS subscription with any authorised foreign application profiles of other IMS subscriptions, regardless of whether the different IMS subscriptions are controlled by the same or different IMS operators. However, the handling of the authorising reference and the AL may be somewhat different in practice for the case of different IMS operators as compared with the case of one and the same operator, which will be described in more detail later below by means of implementation examples.

Figure 6:
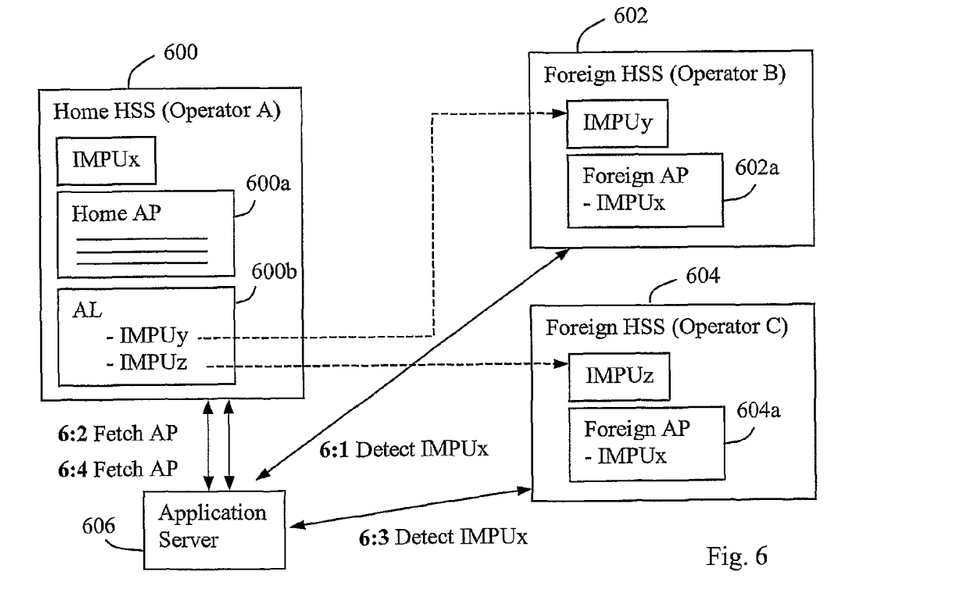
FIG. 6 is a block diagram of three different HSS nodes sharing the same application profile, according to another embodiment.

FIG. 6 illustrates an example of using a shared application profile across plural IMS subscriptions when executing a service based on that application profile, according to another embodiment. It is assumed that the same application profile for a certain service (e.g. IPTV) is valid for three public IMS identities IMPUx, IMPUy, IMPUz of separate IMS subscriptions. In this example, the IMS subscriptions are controlled by different IMS operators A, B and C, although the shown arrangement and procedure may also be valid for the case when one and the same operator controls all subscriptions. Here, operator A controls an HSS node 600, operator B controls an HSS node 602, and operator C controls an HSS node 604.

The home HSS node 600 hosts an application profile 600a for IMPUx, thus being a home application profile (AP). In the case of an IPTV service, application profile 600a might typically contain approved/preferred channels, film genre, subtitle language, screen format, etc. An AL 600b for application profile 600a is also maintained in HSS 600 containing a list of authorising identifiers associated with other public IMS identities for which access is allowed to the home application profile 600a.

The foreign HSS node 602 hosts a foreign application profile 602a for IMPUy, and the foreign HSS node 604 hosts a foreign application profile 604a for IMPUz. Instead of hosting the full application profile, each application profile 602a and 604a contains a profile reference IMPUx that can be used for accessing the home application server 600a. Authorising identifiers for IMPUy and IMPUz are also present in the AL 600b in the home HSS node 600. As mentioned above, the respective foreign IMPU can be used as the corresponding authorising identifier in AL 600b, as shown in this example, e.g. according to the following structure: IMPUy=SIP:IMPUx@IMSOPB.com.and IMPUz=SIP:IMPUx@IMSOPC.com if SIP signalling is used.

FIG. 6 also illustrates schematically the basic stages in a procedure when an application server 606 accesses the application profile in order to execute the service for IMPUy and IMPUz, respectively. It should be understood that each shown stage represents the communication of plural suitable messages back and forth, depending on the implementation.

As a user of IMPUy invokes the service in application server 606, server 606 attempts to fetch an application profile from the HSS 602 of that IMPUy. However, since the full application profile is not stored in HSS 602, the profile reference IMPUx is supplied instead from HSS 602, as illustrated in a stage 6:1 of detecting the profile reference IMPUx.

It is assumed that application server 606 is configured to understand that the given profile reference IMPUx can be used to find the application profile for IMPUy in the home HSS node 600. More specifically, the domain of the home HSS node is actually indicated in the profile reference IMPUx. Thus, application server 606 requests the application profile from HSS node 600 on behalf of the foreign IMPUy, wherein the HSS node 600 checks in the AL 600b whether IMPUy is authorised to access the application profile or not. Since IMPUy can be found as an authorising identifier in AL 600b, HSS node 600 can provide the home application profile 600a to the application server 606, which is generally illustrated by a stage 6:2.

In the same manner, when the service is invoked in application server 606 by a user of IMPUz, server 606 attempts to fetch the necessary application profile from HSS 604, but instead receives or detects the profile reference IMPUx in a stage 6:3. Using the profile reference IMPUx, application server 606 then requests the application profile from HSS node 600 on behalf of IMPUy. Since IMPUy is present as an authorising identifier in AL 600b, thereby being authorised to access the application profile, HSS node 600 can provide application profile 600a to the application server 606, in a stage 6:4.

Figure 7:
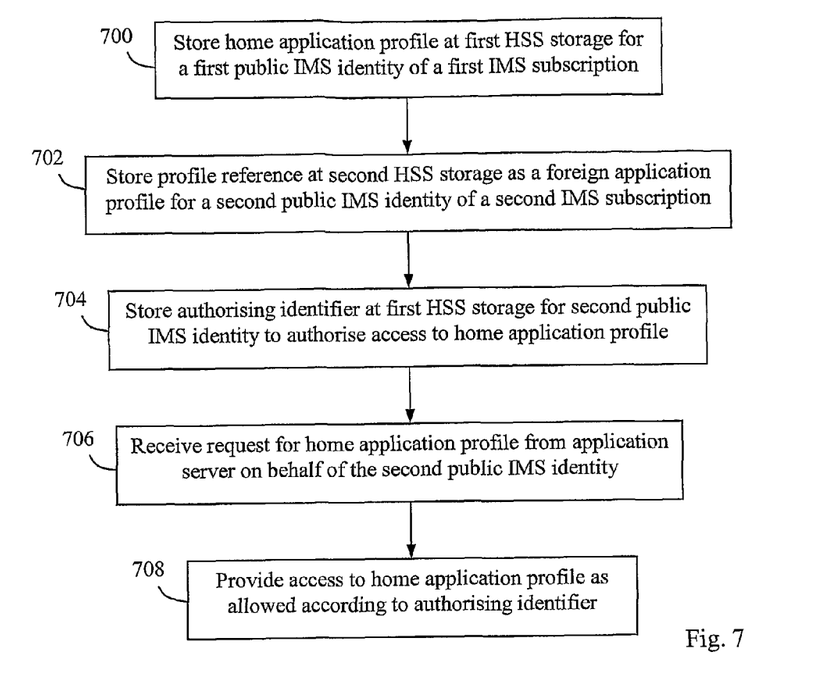
FIG. 7 is a flow chart illustrating a procedure of establishing the same application profile for different public IMS identities of different IMS subscriptions, according to another embodiment.

A procedure for sharing an application profile for plural public IMS identities across different IMS subscriptions will now be described with reference to a flow chart in FIG. 7. In a first step 700, a home application profile is stored in its entirety at a first HSS storage or node for a first public IMS identity of a first IMS subscription. The first public IMS identity may be utilised for a certain device by means of the first IMS subscription, if implemented in an UICC inserted in that device.

When a user wants to be able to employ the same application profile in another device under a second public IMS identity of a second IMS subscription, a profile reference is stored at a second HSS storage or node as a foreign application profile for the second public IMS identity, in a next step 702. The profile reference thus points to the home application profile lodged in the first HSS storage, e.g. by indicating the domain thereof.

In a following step 704, an authorising identifier is also stored at the first HSS storage for the second public IMS identity, to authorise access to the home application profile. In this step, the authorising identifier may be added to an access list (AL) defined for the home application profile. It should be noted that it is possible to reverse the order of steps 702 and 704, such that the authorising identifier is stored at the first HSS storage before storing the profile reference at the second HSS storage. In practice, the order of steps 700-704 is actually not strict and these steps can basically be executed more or less independent of each other.

Steps 700-704 above have been executed (in any non-compulsory sequence) to establish the application profile for the first and second public IMS identities. In a following step 706, the first HSS storage receives, from an application server at some point later, a request for the home application profile on behalf of the second public IMS identity. The application server may send the request of step 706 when a user has invoked a service requiring the application profile, using the second public IMS identity. As explained in the description of FIG. 6 above, the application server initially attempts to fetch the profile from the second HSS storage, but instead receives or detects the profile reference stored in step 702. Using the received or detected profile reference, e.g. indicating the domain of the first HSS storage, the application server is able to find the correct HSS storage lodging the application profile.

In a final step 708, the first HSS storage provides access to the home application profile for the requesting application server, as allowed for the second public IMS identity according to the authorising identifier stored in step 704 above.

In a conventional provisioning system for generally establishing or provisioning an application profile for a device, the XML (eXtensible Markup Language) protocol is typically used, and the user communicates with the IMS operator via a proxy and an XML Data Management Server (XDMS), the proxy being a web server XDMC or similar. The user may communicate either over a helpdesk, or directly from the device when self-provisioning is used. The XDMS may be connected to a provisioning server of the IMS operator, that handles internal provisioning in an HSS node and a device management server.

In the following, a more detailed example will be described of how the inventive procedure for sharing an application profile in the above-described manner can be implemented, with reference to the signalling diagrams in FIG. 8a and FIG. 8b. It is assumed that a user wants to employ the same application profile of an IPTV service, as valid for an IMPU(MT) of a mobile terminal MT and for his/her personal IMPU(STB) of an STB, and that the conventional provisioning system described above is basically utilised. The user performs provisioning of IMPU(MT) from the mobile terminal and provisioning of IMPU(STB) from the STB device. The STB may of course have further IMPUs implemented as well, in addition to the personal one IMPU(STB) discussed below.

Figure 8A:
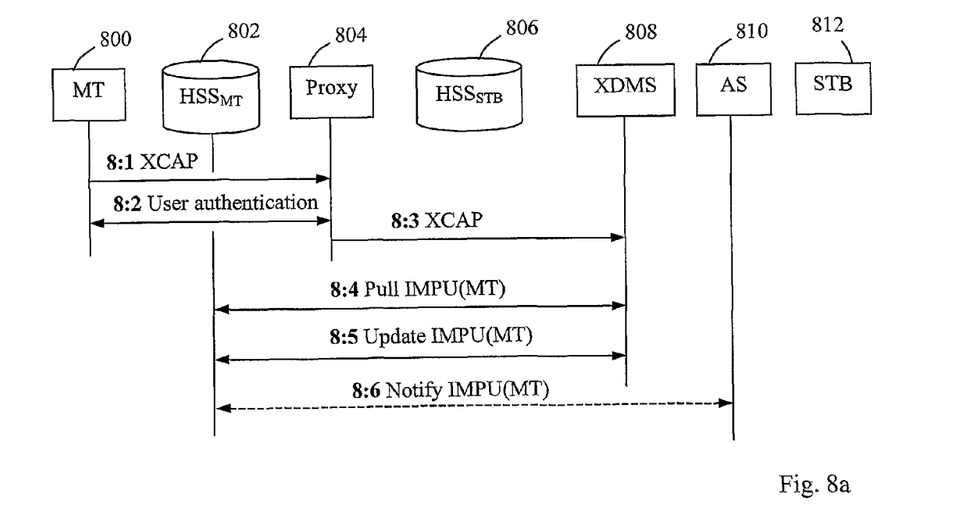
FIGS. 8a and 8b are signalling diagrams illustrating a procedure of sharing the same application profile in two HSS nodes, according to another embodiment.
Figure 8B:
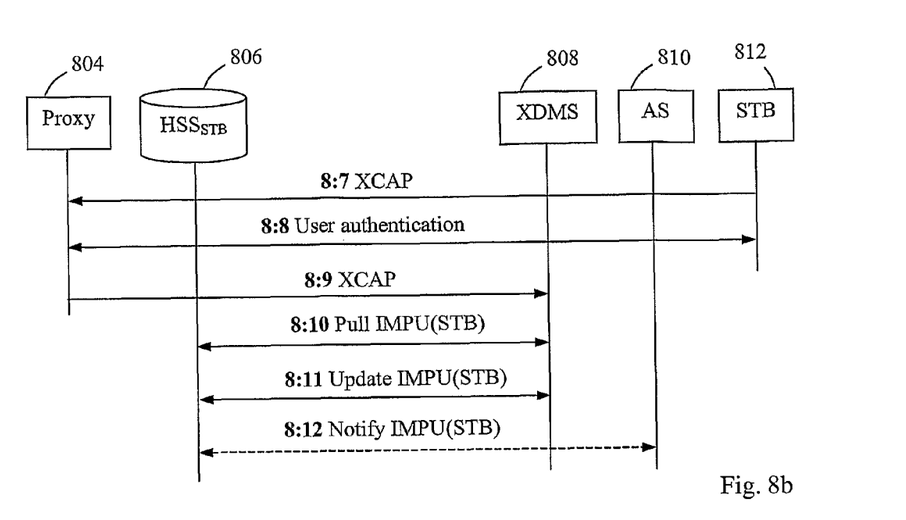

Thus, FIGS. 8a and 8b illustrate various messages involving the mobile terminal 800, an HSS node 802 at a mobile operator for IMPU(MT), an aggregation proxy 804, an HSS node 806 at a wireline operator for IMPU(STB), an XDMS 808, an application server 810 for the IPTV service, and finally the STB 812. More specifically, FIG. 8a shows how the user provisions the home application profile for MT 800, as well as an authorising identifier in an AL, in the home HSS node 802 via an intermediate provisioning application in XDMS 808. FIG. 8b shows how the user provisions the same application profile for STB 812 in HSS node 806, as represented by a profile reference pointing to the home application profile at the mobile operator.

In a first step 8:1, the user sends an XCAP (XML Configuration Access Protocol) message from MT 800 to the proxy 804, containing a request to modify parameters in the IMPU (MT). Generally, the protocol XCAP allows a client to read, write and modify application configuration data. In a next step 8:2, a conventional routine for user authentication is executed between MT 800 and proxy 804. After successful authentication of the user, proxy 804 forwards the XCAP message to the XDMS node 808, in a next step 8:3.

In response thereto, the XDMS node 808 fetches the parameters of the IMPU(MT) from the HSS node 802, e.g. over an Sh interface, in a following step 8:4. The next step 8:5 illustrates that XDMS node 808 generally updates the parameters of the IMPU(MT) in HSS node 802. In practice, the new application profile may be provisioned by sending the profile in its entirety in a so-called "BLOB" (Binary Large Object), not shown, which is basically a container for binary data handled as a single entity in database management systems. A "TV-BLOB" may generally be used for provisioning an application profile for an IPTV service, although the present invention is not limited in this respect.

In step 8:5, the AL for the new application profile of the IPTV service is also updated by introducing an authorising identifier for the IMPU(STB), effectively authorising access to the new application profile on behalf of IMPU(STB). In this example, the authorising identifier in the AL is the IMPU (STB). Likewise, the updated AL can be sent as an AL-BLOB to the HSS node 802.

A next optional step 8:6 further illustrates that the HSS node 802 may notify the IPTV application server 810 on the updated IMPU(MT), e.g., by sending a brief notification message or the like that may be sent, e.g., over an Sh interface. The IPTV application server 810 may then be free to check the updated IMPU(MT) in the HSS node 802.

In FIG. 8b, the user has moved to the STB 812 and sends an XCAP message therefrom to the aggregation proxy 804 with a request to modify parameters in his/her personal IMPU (STB), in a step 8:7. In a next step 8:8, user authentication is executed between STB 812 and proxy 804, and after successful authentication, proxy 804 then forwards the XCAP message to the XDMS node 808, in a further step 8:9.

In response thereto, the XDMS node 808 fetches the parameters of the IMPU(STB) from the HSS node 806, e.g. over an Sh interface, in a following step 8:10. Thereafter, the XDMS node 808 updates the parameters of the IMPU(STB) in HSS node 806 according to the received XCAP message, in a further step 8:11. More specifically, the new application profile is provisioned by sending a profile reference as an abbreviated application profile, pointing to the application profile now being lodged in the HSS node 802. In this example, the profile reference is the IMPU(MT), which can be sent in a TV-BLOB to HSS node 806. The IMPU(MT) actually indicates the domain of HSS node 802 enabling an application server to find the correct HSS node.

A final optional step 8:12 further illustrates that the HSS node 806 may notify the IPTV application server 810 on the updated IMPU(STB), e.g. by sending a brief notification message thereto that may be sent, e.g., over an Sh interface.

In this description, it is generally assumed that in order to obtain an application profile for executing a requested service in "run-time", the application server is capable of communicating with the necessary HSS nodes. For the IPTV service example above, the application server 810 can communicate with the home HSS 806 hosting a family subscription, e.g. realized in an ISIM in the STB 812.

Different trust models may apply depending on the relation between the different business/administrative domains the HSS nodes and the IPTV application server belong to. Below, two basic trust models are outlined requiring different levels of security.

1. The High Confidence Trust Model. (also known as the "Walled Garden") The basic case of this model is when the home and foreign HSS nodes and the IPTV application server all belong to the same business administrative domain. In that case, standard security mechanisms can be used during the communication. In general, identifiers of application servers may be stored at the home HSS node, to indicate allowed access to the first HSS storage. For example, the AL may also contain a list of allowed application servers, such as the IPTV application server above, which are all capable of retrieving available profile data from both HSS nodes, e.g. over an Sh interface. A typical example of this scenario would be the so-called "triple play" operators where a single convergent (e.g. multi-national) operator offers fixed telephony, mobile telephony and broadband services. In the simplest case, one and the same HSS node is used for both the fixed and mobile domains, i.e. $HSS_{STB}=HSS_{MT}$.

2. The Federated Trust Model. A more open scenario according to this model would be the case where, e.g., the mobile domain of a mobile subscription and the fixed domain of an STB subscription are different business administrative domains, e.g. controlled by different operators. For example, an IPTV application server could belong to either of these domains, or even to a third business administrative domain having its own security means and routines. Preferably, the security mechanisms needed for the IPTV application server to be able to communicate with an HSS node belonging to another domain, should then be generally more advanced and reliable. In this case, a federation infrastructure for sharing user and application profiles, such as the infrastructures of the Generic User Profile (GUP) or Liberty Alliance, could be employed.

Figure 9:
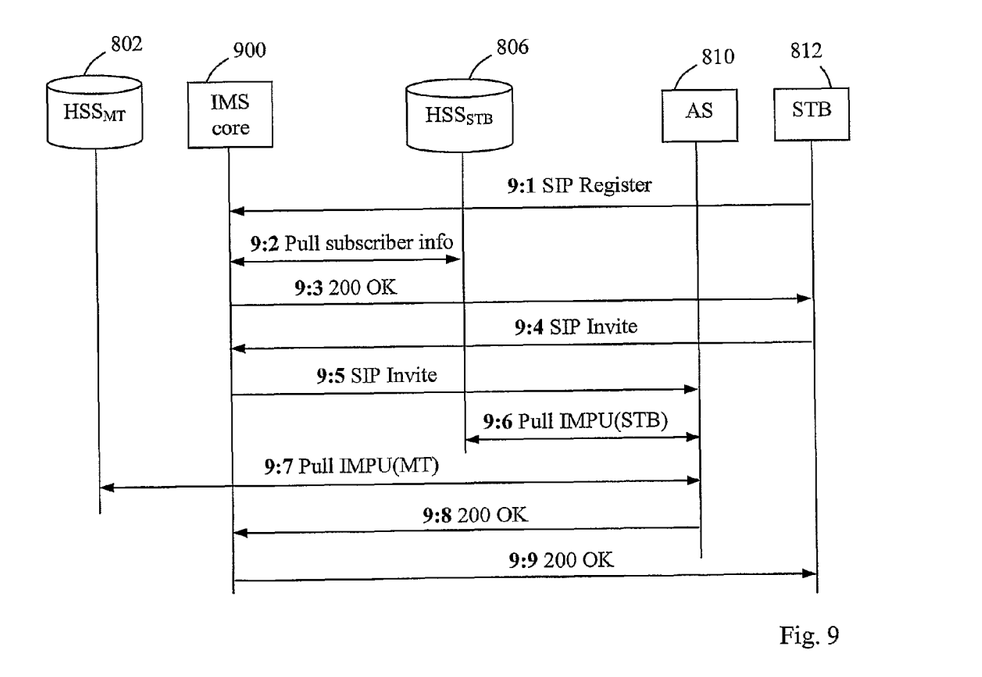
FIG. 9 is a signalling diagram illustrating that an application server accesses an application profile shared in two HSS nodes, when the high confidence trust model is applicable, according to another embodiment.

FIG. 9 is a signalling diagram illustrating the communication flows as an IPTV application server accesses the application profile provisioned according to FIGS. 8a and 8b above, for executing the IPTV service in run-time when the high confidence trust model is applicable. Using the same numerals as above, the communication flows of FIG. 9 involve the HSS nodes 802 and 806, the application server 810 and the STB 812, the latter being currently used by the user to enjoy the IPTV service. Further, the IMS network is also involved for session control, here represented by an "IMS core" function 900 which might be performed by any of the IMS session control nodes P-CSCF, I-CSCF and S-CSCF.

In a first step 9:1, an SIP Register message is sent from the STB 812 to the IMS core 900, as the user initially activates the STB 812 using his/her personal IMPU(STB). The IMS core 900 then pulls necessary subscriber information from HSS node 806 for the IMPU(STB) in a step 9:2, according to conventional routines. The registration phase is then completed as the IMS core sends a 200 OK message to STB 812 in a step 9:3.

The user then invokes the IPTV service, and STB 812 accordingly sends an SIP Invite message for IMPU(STB) to the IMS core 900 requesting a session with the IPTV application server 810, in a further step 9:4. IMS core 900 then forwards the SIP Invite message containing IMPU(STB) to server 810, in a next step 9:5.

In response to the session request, application server 810 now attempts to access and fetch the application profile for IMPU(STB) from the HSS node 806 of the STB, as illustrated by a further step 9:6 of pulling the profile for IMPU(STB). Application server 810 knows it should request the profile from the HSS node 806 by means of the domain name information indicated in IMPU(STB), e.g. according to the structure of id@domain_name_stb.

However, HSS node 806 does not hold the full application profile for IMPU(STB), but only an abbreviated application profile with a profile reference pointing to the profile which is lodged in HSS node 802. In this example, the profile reference is the IMPU(MT), which is provided to the application server 810 during this step, e.g. in a TV-BLOB. It should be noted that step 9:6 basically corresponds to stage 6:1 or stage 6:3 in FIG. 6.

As mentioned above, it is generally assumed in this solution that the application server will understand from the given profile reference that the application profile can be fetched from the HSS node indicated by the profile reference. Therefore, application server 810 attempts to fetch the application profile from the HSS node 802 of the MT instead, now using the profile reference IMPU(MT), as illustrated by a further step 9:7 of pulling the profile for IMPU(MT). Thus, application server 810 knows it should request the profile from HSS node 802 by means of the domain name information indicated in IMPU(MT), e.g. according to the structure of id@domain_name_mt.

In step 9:7, HSS node 802 also checks the AL of this application profile, and finds an authorising identifier corresponding to IMPU(STB) therein allowing the application server to fetch the profile on behalf of IMPU(STB). In this example, the authorising identifier in the AL is IMPU(STB), as provisioned in step 8:5 above.

As mentioned above, the AL may also contain a list of application servers allowed to retrieve application profiles from the HSS node 802, in the case of the high confidence trust model, to provide extra security. If this model is applicable, HSS node 802 may thus also find the application server 810 in a list of such trusted application servers.

Anyway, application server 810 thus obtains the wanted application profile in its entirety from the HSS node 802 in step 9:7. Application server 810 then completes the session establishment by sending a 200 OK message to IMS core 900 in a step 9:8, and IMS core 900 finally sends the 200 OK message to STB 812, in a last illustrated step 9:9. Application server 810 is then ready to provide the requested IPTV service to STB 812 for IMPU(STB), based on the application profile obtained from HSS node 802 and belonging to IMPU(MT).

In the examples described above, the IMPU is used as the profile reference, which contains a domain name as an indication of the correct HSS node holding the application profile. However, any other alias or the like can be used as the profile reference as long as it contains an indication pointing or leading to the correct HSS node, and the present invention is not limited in this respect.

Furthermore, application server 810 may also enforce access control to the referred application profile. For this, application server 810 may analyse the AL information included in the TV-BLOB structure, if received in step 8:6 above. Application server 810 would then make use of the information received from $HSS_{MT}$ 802 only if IMPU(STB) is included in the AL with IMPUs allowed to share the application profile of IMPU(MT). Otherwise, the application server 810 shall terminate the session with a suitable error message.

When the application server and the different IMS subscriptions belong to different business/administrative/security domains according to the federated trust model of low confidence described above, the mechanisms that allow the application server to access application profiles in the different HSS nodes should provide a higher degree of security.

Operators are currently developing technologies for federated trust models that basically maintain the existing internal protocols and procedures as such, but enforce higher security at the network domain edge. Examples of these technologies are Parlay, ParlayX, Web services, 3GPP GUP architecture and Liberty Alliances.

3GPP GUP enables a harmonised usage of user-related information located in different entities by providing a number of features, such as: a harmonised access interface, a single point of access, authentication and authorization of profile access, etc.

3GPP GUP is highly based on the Identity Web Services Framework (ID-WSF) technology for sharing user profiles according to the Liberty Alliance Project (LAP). In LAP, a Discovery Service is defined and 3GPP GUP mandates GUP requestors outside the Mobile Network domain to use of the Discovery Service.

The Discovery Service defined for the Liberty Alliance is able to inform GUP requestors on the peer entity and message authentication mechanisms to be used. Additionally, the Discovery Service shall provide the necessary Authentication assertions as defined for the Security Mechanisms the Liberty Alliance.

In the present solution, an application server needing an application profile for executing a requested service, may utilise the above-described GUP architecture and Discovery Service for accessing the application profile from a home HSS node in a different business/administrative/security domain.

Following the GUP architecture, the application server would thus act as a third party application outside the mobile network operator domain. According to GUP terminology, the application server is then a "GUP requestor", e.g. over an Rg interface. Further, the HSS node would acts as a "GUP repository", and a GUP server at the edge of a network domain would handle requests from the external application server, e.g. via an Rg interface, in order to enforce a higher degree of security.

An example of how the present invention can be accommodated to work with the GUP architecture when the federated trust model is applicable, will now be described with reference to FIG. 10, again involving the IPTV application server 810 and the HSS node 802 holding the application profile for IMPU(MT). The GUP architecture further provides a discovery service function 1000 and a GUP server 1002, which are also used in this example. The adaptation to other similar technologies would follow a similar approach.

Figure 10:
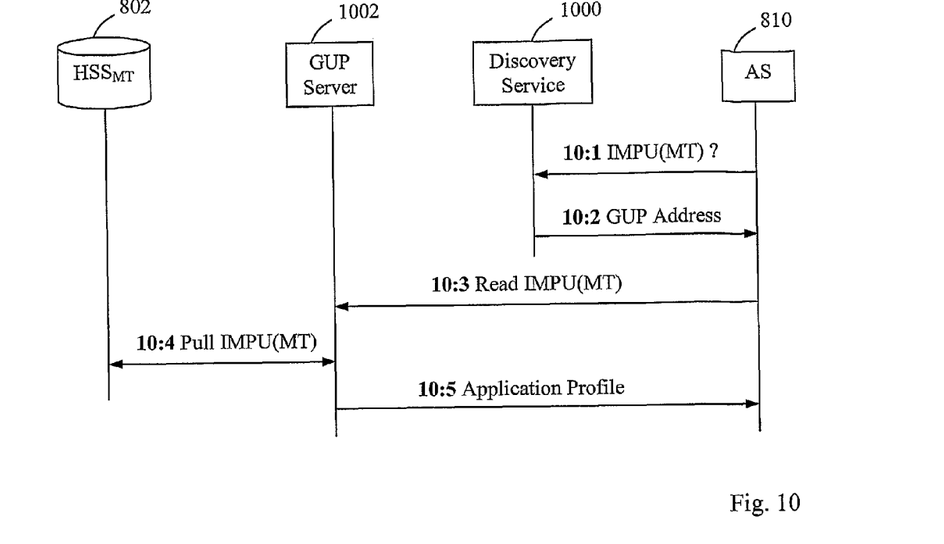
FIG. 10 is a signalling diagram illustrating that an application server accesses a application profile shared in two HSS nodes, using the GUP (Generic User Profile) architecture when the federated trust model is applicable, according to another embodiment.

It is assumed that the application server 810 has already attempted to access the application profile from the HSS node of STB using IMPU(STB), and has instead obtained therefrom the IMPU(MT) as a profile reference. Then, the application server 810 analyses the domain indicated by the received IMPU(MT), e.g. using local policies, and finds that the IMPU(MT) belongs to a different business domain. Therefore, the application server 810 contacts the corresponding discover service 1000 in a first shown step 10:1, basically asking for the IMPU(MT). In response thereto, application server 810 receives the address of the GUP server 1002 from discovery service 1000, in a next step 10:2. The discovery service 1000 also provides a so-called SAML (Security Assertion Markup Language) assertion that authorizes application server 810 to access the $HSS_{MT}$ 802, SAML being an XML-based framework for generally exchanging security information.

The application server 810 then contacts the GUP server 1002 in a request for the application profile of IMPU(MT), also referring to IMPU(STB) and the previously received SAML assertion, in a following step 10:3. The GUP server 1002 checks the SAML assertion and fetches the TV-BLOB associated with IMPU(MT) from the HSS node 802, in a further step 10:4, which includes the application profile as well as the associated AL with authorised IMPUs. The GUP server 1002 then checks in the fetched TV-BLOB that IMPU (STB) is present in the AL, and accordingly proceeds to deliver the application profile to the application server 810, in a final step 10:5.

It should be noted that GUP is an architecture defined by 3GPP, so it can basically be used by an application server trying to access an HSS node within a mobile domain. In the case when an application server needs to access an HSS node in the fixed domain, e.g. for an STB, a full LAP ID-WSF environment could be used instead.

Figure 11:
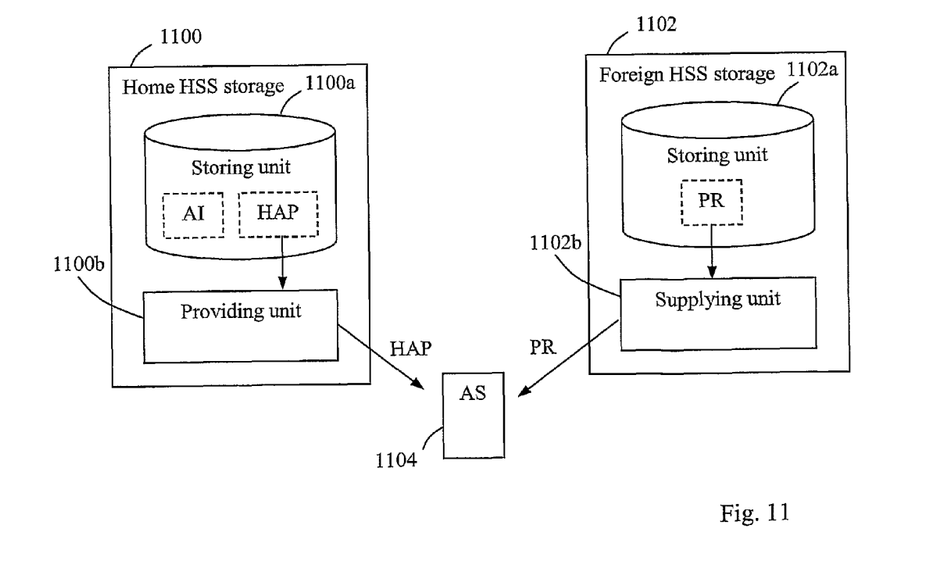
FIG. 11 is a schematic block diagram of a home HSS storage 1100 and a foreign HSS storage 1102, in accordance with further embodiments.

FIG. 11 is a block diagram illustrating schematically a home HSS storage 1100 and a foreign HSS storage 1102, in accordance with further embodiments.

The home HSS storage 1100 comprises a storing unit 1100a adapted to store a provisioned home application profile HAP for a first public IMS identity of a first IMS subscription. The storing unit 1100a is also adapted to store an authorising identifier AI to authorise access to the home application profile for a second public IMS identity of a second IMS subscription. The home HSS storage 1100 further comprises a providing unit 1100b adapted to provide the home application profile to an application server AS 1104 according to the authorising identifier AI, in response to a request for the home application profile from the application server 1104 on behalf of the second public IMS identity.

The foreign HSS storage 1102 comprises a storing unit 1102a adapted to store a profile reference PR as an abbreviated foreign application profile for the second public IMS identity, the profile reference pointing to the home application profile HAP in the home HSS storage 1100. The foreign HSS storage 1102 further comprises a supplying unit 1102b adapted to supply the profile reference PF in response to a request for the application profile from the application server 1104 on behalf of the second public IMS identity.

Thus, in the same way as described for FIG. 6 above, the application server 1104 first obtains the profile reference PF from the foreign HSS storage 1102, and then obtains the home application profile HAP from the home HSS storage 1100 by means of the earlier obtained profile reference PF. Hence, the authorising identifier AI in storing unit 1100a allows the application server 1104 to obtain the home application profile HAP on behalf of the second public IMS identity.

The advantages that can be obtained when using the present invention may include the aspects given below.

For the end-user:
  Reduced efforts, since the application profile needs to be defined, modified are maintained for only one IMPU.
  Enhanced user experience, as the information in the application profile is unique to avoid inconsistencies.

For the IMS operator:
  Reduced complexity and amount of redundant data stored in HSS nodes.
  Reduced processing and traffic load for the provisioning and O & M (Operation & Maintenance) procedures related to application profiles.
  Increased service usage.

In the embodiments described above, public IMS identities IMPUs have been used both as authorising identifiers in the AL of the home application profile, and as profile references in the foreign application profile. However, any other aliases or the like associated with these IMPUs may be used, and the present invention is not limited in this respect.

While the invention has been described with reference to specific exemplary embodiments, the description is in general only intended to illustrate the inventive concept and should not be taken as limiting the scope of the invention. For example, the concepts of IMS and SIP have been used throughout when describing the above embodiments, although any other standards and protocols for enabling multimedia communication may basically be used. Moreover, it is assumed that the skilled person is familiar with the above-mentioned exemplary Sh and Rg interfaces as well as the GUP architecture, Discovery Service and SAML assertion, thus not needing further description. The present invention is generally defined by the appended claims.

What is claimed is:

1. A method of sharing an application profile for plural public IP Multimedia Subsystem (IMS) identities across different IMS subscriptions, comprising the steps of:
  storing at a first Home Subscriber Server (HSS) storage a home application profile for a first public IMS identity (IMPUx) of a first IMS subscription;
  storing at a second HSS storage a profile reference as an abbreviated foreign application profile for a second public IMS identity (IMPUy) of a second IMS subscription, the profile reference pointing to said home application profile in the first HSS storage; and
  storing at the first HSS storage an authorizing identifier for the second public IMS identity that authorises access to said home application profile, wherein when the first HSS storage receives a request for the home application profile from an application server on behalf of the second public IMS identity by means of the profile reference, access to the home application profile is allowed for the application server according to said authorizing identifier.

2. The method according to claim 1, wherein the first public IMS identity (IMPUx) or an associated alias is used as the profile reference.

3. The method according to claim 1, wherein the second public IMS identity (IMPUy) or an associated, alias is used as the authorizing identifier.

4. The method according to claim 1, wherein said authorizing identifier is added to an access list for the home application profile at the first HSS storage.

5. The method according to claim 1, wherein said access list contains a list of authorizing identifiers associated with other public IMS identities for which access is allowed to the home application profile.

6. The method according to claim 1, wherein the domain of the first HSS storage is indicated in the profile reference.

7. The method according to claim 1, wherein the second HSS storage supplies said profile reference in response to a request for the application profile from the application server on behalf of the second public IMS identity.

8. The method according to claim 7, wherein the first HSS storage provides the home application profile to the application server according to said authorizing identifier, in response to a request for the home application profile from the application server using the profile reference.

9. A home Home Subscriber Server (HSS) storage, comprising:
  a storing unit adapted to store a home application profile (HAP) for a first public IP Multimedia Subsystem (IMS) identity of a first IMS subscription and an authorizing identifier (AI) for a second public IMS identity of a second IMS subscription, to authorize, access to said home application profile, and a providing unit operable to provide the home application profile to an application server (AS) according to said authorizing identifier, in response to a request based on a profile reference for the home application profile from the application server on behalf of the second public IMS identity, wherein the profile reference (PR) has been stored at a foreign HSS storage as an abbreviated foreign application profile for the second public IMS identity, the profile reference pointing to said home application profile in the home HSS storage.

10. The home HSS storage according to claim 9, wherein said means for storing an authorizing identifier is adapted to add the authorizing identifier to an access list (600b) for the home application profile.

11. The home HSS storage according to claim 9, wherein the second public IMS identity or an associated alias is used as the authorising identifier.

12. A foreign Home Subscriber Server (HSS) storage used for sharing an application profile for plural public IP Multimedia Subsystem (IMS) identities across different IMS subscriptions, the foreign HSS storage comprising:

a storing unit configured to store a profile reference (PR) as an abbreviated foreign application profile for a second public IMS identity, the profile reference pointing to a home application profile (HAP) for a first public IP Multimedia Subsystem (IMS) identity of a first IMS subscription stored in a home HSS storage, and a supplying unit configured to supply said profile reference in response to a request for the application profile from an application server on behalf of the second public IMS identity, wherein access to the HAP via the second public IMS identity is authorized by an authorizing identifier stored at the home HSS storage, said access to HAP based upon a request from the application server to the home HSS storage using the supplied profile reference.

13. The foreign HSS storage according to claim 12, wherein the first public IMS identity or an associated alias is used as the profile reference.

14. The foreign HSS storage according to claim 12, wherein the domain of the first HSS storage is indicated in the profile reference.

* * * * *

UNITED STATES PATENT AND TRADEMARK OFFICE
CERTIFICATE OF CORRECTION

PATENT NO. : 8,184,623 B2
APPLICATION NO. : 12/596470
DATED : May 22, 2012
INVENTOR(S) : Barriga et al.

It is certified that error appears in the above-identified patent and that said Letters Patent is hereby corrected as shown below:

In Column 3, Line 52, delete "300:." and insert -- 300: --, therefor.

In Column 16, Line 45, in Claim 5, delete "claim 1," and insert -- claim 4, --, therefor.

Signed and Sealed this
Twenty-third Day of October, 2012

David J. Kappos
*Director of the United States Patent and Trademark Office*